United States Patent
Grieger

(10) Patent No.: US 6,898,146 B2
(45) Date of Patent: May 24, 2005

(54) SCREWLESS INNER RACE FOR STREAMER CABLE CONNECTOR

(75) Inventor: Stephen L. Grieger, Needville, TX (US)

(73) Assignee: Concord Technologies, L.P., Houston, TX (US)

( * ) Notice: Subject to any disclaimer, the term of this patent is extended or adjusted under 35 U.S.C. 154(b) by 0 days.

(21) Appl. No.: 10/460,109

(22) Filed: Jun. 11, 2003

(65) Prior Publication Data

US 2003/0227822 A1 Dec. 11, 2003

Related U.S. Application Data

(60) Provisional application No. 60/387,967, filed on Jun. 11, 2002.

(51) Int. Cl.[7] .................................................. G01V 1/38
(52) U.S. Cl. ............................. 367/15; 367/16; 367/18
(58) Field of Search .............................. 367/15, 16, 18, 367/149; 24/20 TT, 16 R; 114/249, 253

(56) References Cited

U.S. PATENT DOCUMENTS

| | | | |
|---|---|---|---|
| 4,128,918 A | * 12/1978 | Wenk | 24/16 R |
| 4,290,124 A | 9/1981 | Cole | 367/18 |
| 4,709,355 A | 11/1987 | Woods et al. | 367/16 |
| 5,216,784 A | * 6/1993 | Dyer | 24/20 TT |
| 5,529,011 A | 6/1996 | Williams, Jr. | 114/245 |
| 5,709,497 A | * 1/1998 | Zoch et al. | 403/24 |
| 6,101,684 A | * 8/2000 | Ginocchio | 24/16 R |
| 6,292,436 B1 | * 9/2001 | Rau et al. | 367/149 |

* cited by examiner

Primary Examiner—Thomas H. Tarcza
Assistant Examiner—Scott A. Hughes
(74) Attorney, Agent, or Firm—Gary L. Bush; Andrews Kurth LLP

(57) ABSTRACT

An inner race for a streamer cable connector. The inner race includes first and second curved sections with a screwless fastener for clamping the two sections together about the streamer cable. The two curved sections may be hinged at first ends so that the inner race can be opened like a clam shell for placement about the cable. Cooperating teeth on the second ends of the inner race provide a screwless fastener for the two halves, with the teeth cooperatively arranged to ratchet by each other as the curved sections are closed around the cable.

10 Claims, 2 Drawing Sheets

SCREWLESS INNER RACE FOR STREAMER CABLE CONNECTOR

CROSS REFERENCE TO RELATED APPLICATION

This application is based upon provisional U.S. patent application Ser. No. 60/387,967, filed Jun. 11, 2002 the priority date of which is claimed.

BACKGROUND OF THE INVENTION

1. Field of the Invention

This invention relates generally to the field of auxiliary equipment for marine seismic cables and, more particularly to the attachment of equipment to cables, and even more particularly to the shape and construction of the attachment point.

2. Description of the Prior Art

In the course of conducting marine seismic surveys for oil and gas, it is customary to tow cables, often 3 to 10 kilometers in length, beneath the surface and astern of a survey ship. As many as twelve of these cables are towed at one time. Each cable contains multiple hydrophones as well as associated electronics and other sensors required in the data acquisition process. The cables are called "streamers" and are constructed using semi-solid plastic material or oil filled flexible tubing. They are typically two to three inches in diameter.

When conducting seismic surveys, the depth of the cable must be maintained at a precise distance from the surface. This is accomplished by the use of depth control devices that are attached to the exterior of the streamer cable using collars which are secured around the cable and result in a bearing comprising an inner race and an outer race that allows the cable to be free to rotate within the attachment point. The outer race and inner race are constructed and assembled so that they can rotate with respect to each other. The outer race is attached to depth control devices. Other types of modules for other purposes are attached in the same manner.

When streamers are retrieved, they are wound on large powered reels and are under tension forces of as high as seven thousand pounds. As the cable comes aboard, all external devices are removed prior to storage on the reel. Removal is accomplished by first unlatching the outer portion of the collar with the inner race of the bearing device attached to the cable. If the cable is wound on the reel with the inner race still attached to the cable, the inner race can cause damage to underlying layers of cables due to conventional shapes and materials used in their construction.

The marine seismic industry uses a prior art inner race that includes two semi-cylindrical halves which are first placed about the streamer cable and then fastened together by screws. After the inner race has been exposed to the salt water of the sea for any time, corrosion can occur in the screwed connection making it difficult if not impossible to remove the inner race. Accordingly, it is usually desired to remove the inner race from the cable to prevent damage to the cable during reeling in. Furthermore removing such screws in order to remove the inner race from the streamer cable is difficult in harsh weather conditions.

The prior art collars are described in a number of patents such as:

U.S. Pat. No. 4,290,124 Cole, Jimmy R. Remote Control Cable Depth Control Apparatus U.S. Pat. No. 4,709,355 Woods et al Controller for Marine Seismic Activity U.S. Pat. No. 5,529,011 Williams, Oneil J. Connector for Underwater Cables The Williams patent mentioned above illustrates a prior art connector 30 as show in FIGS. 1 and 2 attached hereto used to connect one or more pieces of equipment such as a depth control mechanism on a float tube to an underwater streamer cable 10. The cable can be towed underwater. In practice, a plurality of depth control mechanisms and other equipment, such as acoustic transceivers are connected to the cable 10 at intervals along its length, which is sometimes up to several kilometers.

Each connector 30 has generally the shape of a cylinder surrounding the cable 10. The connector 30 includes a cylindrical inner collar, referred to as an inner race 31, which is clamped to the outer surface of the cable 10, and a cylindrical outer collar, referred to as an outer race 40 which surrounds this inner race 31 and can freely rotate about the inner race 31. Connecting members, called pylons (not shown), are connected to one of the outer races 40 but not to the inner races 31. As a result, when the cable 10 is being towed through the water, a depth control mechanism can hang beneath the cable 10 and a float tube can float above the cable without being affected by twisting of the cable 10.

As shown in FIGS. 1 and 2, a prior art inner race includes a plurality of arcuate sections which are combined to define a generally tubular shape with a cylindrical bore for receiving the cable 10. The prior art inner race of FIGS. 1 and 2 comprises two semi cylindrical section 32 fastened together by screws 33. The inner race 31 is connected to the cable 10 so as not to slide along the length of the cable 10 during use. The inner race 31 can be connected to the outer surface of the cable 10, or taped or another member may be attached to the cable 10 near the ends of this inner race 31 to define stops which prevent the inner race 31 from moving longitudinally along the cable 10 when subjected to drag forces. Alternatively, the inner diameter of the inner race 31 may be selected so that when the two sections 32 are combined, the cable 10 is tightly clamped between the sections 32 without the cable 10 being damaged.

On its outer periphery, the inner race 31 has a cylindrical bearing surface 34 for rotatably supporting the outer race 40. Two cylindrical flanges 35 each having a larger outer diameter than the bearing surface 34 are formed at the longitudinal ends of the bearing surface 34. The flanges 35 define stops which limit the axial movement of the outer race 40 when it is mounted on the inner race 31. While the flanges 35 need not have any specific shape, preferably they have no sharp corners on their outer peripheries which could catch against objects underwater.

3. Identification of Objects of the Invention

A primary object of the invention is to provide a screwless arrangement for securing two semi-cylindrical halves of an inner race together about a streamer cable.

SUMMARY OF THE INVENTION

The object identified above along with other features and advantages of the invention are incorporated in two semi-cylindrical parts that are arranged and designed to be secured together to form an inner race about a cylindrical streamer cable without the need for threaded fasteners. In a preferred embodiment of the invention, the inner race includes two semi-cylindrical halves each of which is constructed of a strong plastic material. Such halves are hinged along one side thereby allowing the halves to open like a clam shell so that the two halves can be positioned about the cylindrical streamer cables. The other sides are fitted with a screwless fastener such as axial mating serrations or teeth that engage when the two halves are closed about the streamer cable. The angle of the serrations or teeth is less than ninety degrees from a tangent line of the race, thereby effecting a secure closure. Other screwless closures are possible. The inner race is preferably cylindrical in external shape so as to be capable of capture by a cavity in an outer race. The invention contemplates external shapes as of the prior art inner races where ends of the race have raised flanges so that an outer race can be captured thereby.

DESCRIPTION OF A PREFERRED
EMBODIMENTS OF THE INVENTION

Figure 1:
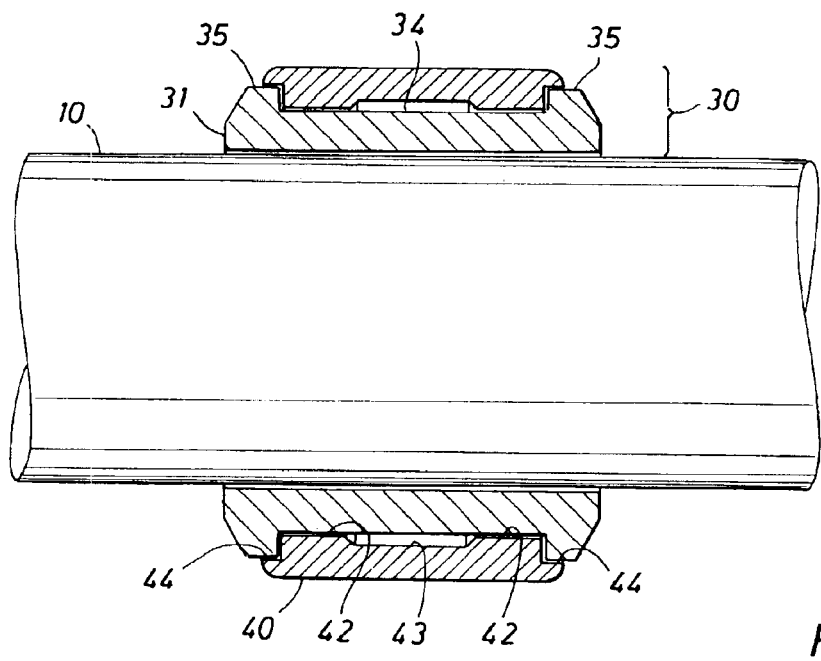
FIGS. 1 and 2 illustrate a prior art inner race of a connector for attaching equipment onto a streamer cable.
Figure 2:
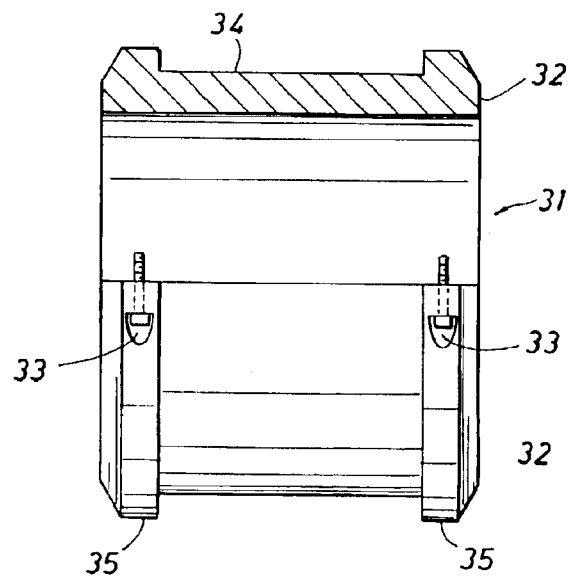
Figure 3:
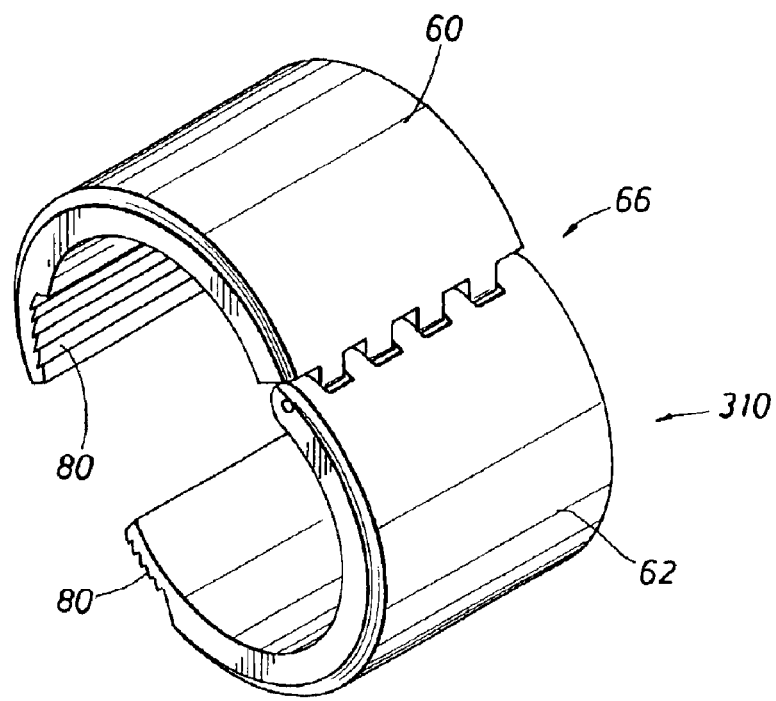
FIG. 3 is a perspective view of one embodiment of a screwless inner race for an attachment collar according to this invention.
Figure 4:
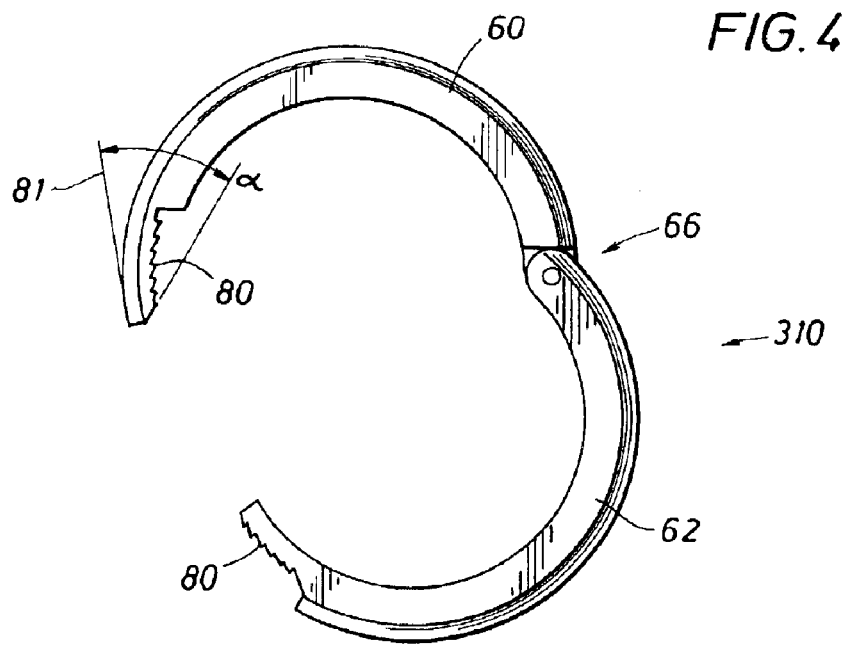
FIG. 4 is an end view of the inner race of FIG. 3 in an open position.

FIGS. 3 and 4 depict a hinged version of the inner race 310 according to the invention with serrations 80 on the two halves 60, 62 of the inner race providing a screwless fastener for the device. A hinge 66 allows halves 60, 62 to open for attachment to or removal of a cable, when the two halves 60, 62 are rotated to a closed position. Other screwless fasteners are contemplated for this invention. Such fasteners can be provided on both sides of the halves where a hinged connection is not desired.

The teeth or serrations 80 of FIGS. 3 and 4 on interior surface of halves 60, 62 are cooperatively arranged such that when the halves 60, 62 close about a streamer cable, the serrations ratchet past each other until a clamped position results with the serrations providing gripping contact with each other. The teeth 80 are cut on an angle that is less than ninety degrees from a tangent line 81 at the closure ends of sections 60, 62.

What is claimed is:

1. An inner race for a connector for connecting equipment to an underwater cable comprising, first and second curved sections each having an inner and an outer surface, said first and second curved sections arranged to fit together around a longitudinal section of said cable, a hinge pivotably connecting first sides of said first and second curved sections, whereby said inner race can be opened for placement around said cable, and screwless fastener elements cooperatively placed on second sides of said first and second curved sections for connecting said second sides of said first and second curved sections, whereby said inner race can be closed about said cable and said screwless fastener elements grip each other to maintain closure of said inner race, whereby said closed inner race provides a generally round, smooth and continuous outer circumferential surface.

2. The inner race of claim 1 wherein, said screwless fastener elements include teeth formed on said inner surface at said second side of said first curved section and said outer surface of said second side of said second curved section, said teeth arranged and designed to ratchet past each other when said first and second curved sections close about said cable, said teeth allowing said first and second curved sections to be tightly clamped about said cable.

3. The inner race of claim 2 wherein, an angle of the teeth at said second ends of said first and second curved section is less than ninety degrees from a tangent line of the race thereby providing a secure closure of said first and second curved sections.

4. The inner race of claim 1 wherein, said closed inner race is generally cylindrically shaped and characterized by having a longitudinal length.

5. The inner race of claim 4 wherein, said screwless fastener elements are axially disposed at said second sides of said first and second curved sections along said a portion of said longitudinal length.

6. The inner race of claim 4 further comprising, first and second raised flanges disposed on said outer surface at first and second distal ends of said generally cylindrically shaped closed inner race and designed and arranged for axially capturing an outer race disposed therebetween, said outer race having a generally tubular inner surface which is designed and arranged to revolve about said generally cylindrically shaped closed inner race.

7. An inner race for a connector for connecting equipment to an underwater cable comprising, first and second curved sections each having an inner and an outer surface, said first and second curved sections arranged to fit together around a longitudinal section of said cable, first pair of teeth axially disposed at said first sides of said first and second curved section, and second pair of teeth axially disposed at said second sides of said first and second curved section, whereby said first and second curved sections can be interconnected to close about said cable, said first pair of teeth cooperatively grip each other to interconnect said first sides of said first and second curved sections, said second pair of teeth cooperatively grip each other to interconnect said second sides of said first and second curved sections, and said closed inner race provides a generally round, smooth and continuous outer circumferential surface.

8. The inner race of claim 7 wherein,
said closed inner race is generally cylindrically shaped.

9. The inner race of claim 7 further comprising,
first and second raised flanges disposed on said outer surface at first and second distal ends of said generally cylindrically shaped closed inner race and designed and arranged for axially capturing an outer race disposed therebetween, said outer race having a generally tubular inner surface which is designed and arranged to revolve about said generally cylindrically shaped closed inner race.

10. A method for connecting equipment to a cable comprising the steps of,
forming an inner race about a longitudinal portion of said cable by interconnecting first and second curved sections about said longitudinal portion of said cable by snapping a first side of said first curved section into locking engagement with a first side of said second curved section, said inner race providing a generally round, smooth and continuous outer circumferential surface, capturing an inner surface of an outer race rotatively on said outer surface of said inner race such that said outer race is axially fixed with respect to said inner race, and connecting said equipment to a portion of an outer surface of said outer race.

* * * * *